United States Patent [19]

Olinger

[11] Patent Number: 5,007,448

[45] Date of Patent: Apr. 16, 1991

[54] FILLING DEVICE FOR LIQUID FILLED TIRES

[75] Inventor: Harvey A. Olinger, Huntington Beach, Calif.

[73] Assignee: Advanced Commercial Products, Inc., Santa Ana, Calif.

[21] Appl. No.: 477,757

[22] Filed: Feb. 9, 1990

[51] Int. Cl.$^5$ .................... F16K 24/00; B65B 31/04
[52] U.S. Cl. ................... 137/223; 137/588; 141/38; 141/59; 152/DIG. 5
[58] Field of Search .............. 137/223, 588; 141/38, 141/59; 152/415, DIG. 5

[56] References Cited

U.S. PATENT DOCUMENTS

| | | | |
|---|---|---|---|
| 138,421 | 4/1873 | Matthews . | |
| 560,070 | 5/1896 | Staub et al. | 137/588 X |
| 840,469 | 1/1907 | Berry | 141/38 X |
| 913,949 | 3/1909 | Gold . | |
| 2,100,627 | 11/1937 | Bucy et al. | 152/DIG. 5 X |
| 2,203,564 | 6/1940 | Farnsworth . | |
| 2,311,901 | 2/1943 | Palko | 141/38 X |
| 2,320,042 | 5/1943 | McMahan | 152/DIG. 5 X |
| 2,339,381 | 1/1944 | Crowley | 152/427 |
| 2,400,969 | 5/1946 | Baker | 152/DIG. 5 X |
| 2,545,233 | 3/1951 | Kaufman | 137/588 X |
| 2,581,914 | 1/1952 | Darrow | 137/226 X |
| 2,765,835 | 10/1956 | Pavkov | 152/427 |
| 2,847,049 | 8/1958 | Blomquist | 152/DIG. 5 |
| 2,929,432 | 3/1960 | Kominic et al. | 152/415 |
| 3,021,877 | 2/1962 | Wellsch | 141/38 |
| 3,635,275 | 1/1972 | Davis et al. | 152/DIG. 5 X |
| 3,765,469 | 10/1973 | LeJeune | 152/DIG. 5 X |
| 3,986,520 | 10/1976 | Schulter et al. | 137/588 X |
| 4,298,047 | 11/1981 | Bobard | 137/223 X |
| 4,404,985 | 9/1983 | Stasiunas | 137/223 X |
| 4,513,797 | 4/1985 | Tompkins, Jr. | 141/59 X |
| 4,749,010 | 6/1988 | Petell | 141/59 |
| 4,768,537 | 9/1988 | Tash | 137/15 |

Primary Examiner—John Rivell
Attorney, Agent, or Firm—Edward E. Roberts

[57] ABSTRACT

A water filled tire filling device including a barrel portion with an axial bore therethrough. One end of the bore has an enlarged inner diameter with an air vent aperture in the wall thereof, and the inner wall threaded adjacent the open end, with the thread being suitable for attachment to a conventional tire valve member. A valve stem tube is inserted into the bore and secured therein with an end of the tube projecting beyond the end of the enlarged diameter bore portion a distance to be in proximity to the valve needle member of the tire valve when the filling device is connected to the tire valve. For larger volume and/or faster fills the needle valve assembly can be removed prior to insertion of the tube. If the needle valve assembly is not removed, actuation of the valve needle member is accomplished by the inner diameter of the tube being sufficient to pass into proximity with the needle member or sufficient to pass about the needle member and seat against the surrounding valve seat. Liquid entering through the tube depresses the valve needle member of the tire valve member. The other end of the barrel member is provided with a shoulder and a water hose coupling fitting, whereupon attachment of the fitting to a water hose, and attachement of the internally threaded portion of the enlarged diameter bore portion enables filling of the tire with liquid while providing an annular air vent about the periphery of the tube with the air escaping through the vent aperture during the filling operation.

14 Claims, 1 Drawing Sheet

FILLING DEVICE FOR LIQUID FILLED TIRES

BACKGROUND OF THE INVENTION

The background of the invention will be discussed in two parts.

FIELD OF THE INVENTION

This invention relates to filling devices, and more particularly, to a device attachable to the conventional valve stem of a tire for filling the tire with a water or other appropriate liquid ballast.

DESCRIPTION OF THE PRIOR ART

Heavy equipment, such as tractors and the like, utilize water or other appropriate liquid, filled tires as a ballast, that is, as a means for adding additional weight and providing traction during use. One of the problems attendant to filling such large tires with a liquid relates to the filling process. During the insertion of liquid, provision must be made for enabling the escape of air from within the tire.

Prior art devices have generally tended to be specially made devices and apparatus which are mechanically complicated and/or exhibit difficult or time consuming liquid insertion proceedure.

Such prior art devices for filling tires with liquids are shown and described in U.S. Pat. Nos. 2,203,564, entitled "Water Gate for Pneumatic Tires", issued to Farnsworth on June 4, 1940; 2,339,381, entitled "Tractor Valve", issued to Crowley on Jan. 18, 1944; 2,765,835, entitled "Air and Liquid Supply Valve for Tractor Tires", issued to Pavkov on Oct. 9, 1956; 2,929,432, entitled "Method and Apparatus for Filling Tires with Liquid", issued to Kominic et al. on Mar. 22, 1960; 3,635,275, entitled "Tractor Tire Valve Assembly", issued to Davis et al. on Jan. 18, 1972; 3,986,520, entitled "Apparatus and Method for Filling and Removing Liquid Ballast from Tires", issued to Schluter et al. on Oct. 19, 1976; 4,298,047, entitled "Ballasting and Inflation Apparatus", issued to Bobard on Nov. 3, 1981, and 4,404,985, entitled "Air-Liquid Valves for Off-the-Road Vehicle Tires", issued to Stasiunas on Sept. 20, 1983.

Other patents uncovered in a search and directed to valve devices include U.S. Pat. Nos. 138,421, entitled "Apparatus for Filling Bottles", issued to Matthews on Apr. 29, 1873; 913,949, entitled "Filling Valve", issued to Gold on May 2, 1909; and 4,768,537, entitled "Air Hose to Water Hose Adapter and Connector", issued to Tash on Sept. 6, 1988.

Such prior art devices for filling tires with liquid have been unduly complicated and/or time consuming in operation. In accordance with an aspect of the present invention, it is an object of the invention to provide a new and improved device for attachment to a conventional tire valve member for filling the tire with an appropriate liquid.

SUMMARY OF THE INVENTION

The foregoing and other objects of the invention are accomplished by providing a filling device including a barrel portion with an axial bore therethrough. One end of the bore has an enlarged inner diameter with an air vent aperture in the wall thereof, and the inner wall threaded adjacent the open end of the enlarged diameter, with the thread being suitable for attachment to a conventional tire valve member. A valve stem tube is inserted through the enlarged diameter and to the opposite end of the smaller diameter bore and secured thereto, with the other end of the tube projecting beyond the end of the enlarged diameter bore portion a distance sufficient to terminate in proximity to the valve needle member of the valve when the filling device is connected to the tire valve. The other end of the barrel member is provided with a shoulder and a water hose coupling fitting, whereupon attachment of the fitting to a water hose, and attachment of the internally threaded portion of the enlarged diameter bore portion enables filling of the tire with liquid while providing an annular air vent about the periphery of the tube with the air escaping through the vent aperture during the filing operation. If a larger volume fill is required with more rapid filling, the needle valve assembly is first removed prior to insertion of the valve stem tube. If the needle valve is not removed, liquid entering through the tube depresses the valve needle member of the tire valve member. This actuation of the needle valve is accomplished by the inner diameter of the tube being sufficient to pass over the needle member and seat against the surrounding valve seat, or alternatively terminate in sufficient proximity to the end of the valve needle member.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
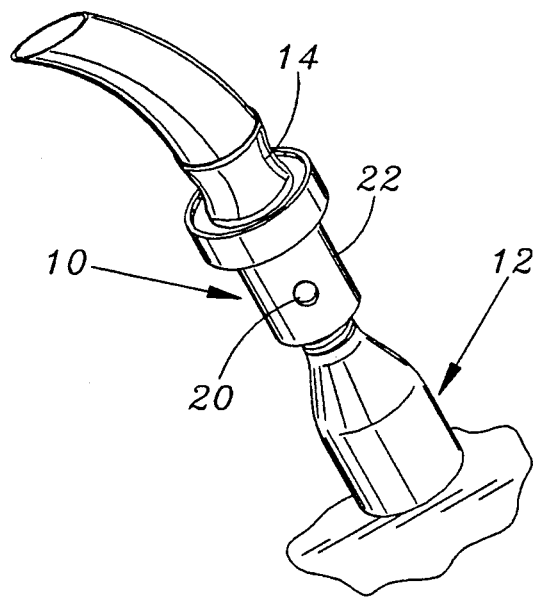
FIG. 1 is a perspective view of the filling device according to the invention attached to a tire valve member and to a hose.

Referring now to the drawings, and particularly to FIG. 1, there is shown a filling device, generally designated 10, attached to a tire valve member, generally designated 12 at one end and a male water hose fitting 14 at the other end. As will become apparent, water (or other suitable liquid) will be passed through the hose fitting 14, through the filling device 10 and through the tire valve member 12 to appropriately fill the tire (not shown) with liquid, while displacing air therein to the atmosphere through a venting aperture 20 in the side wall of the body or barrel 22 of the device 10.

Figure 2:
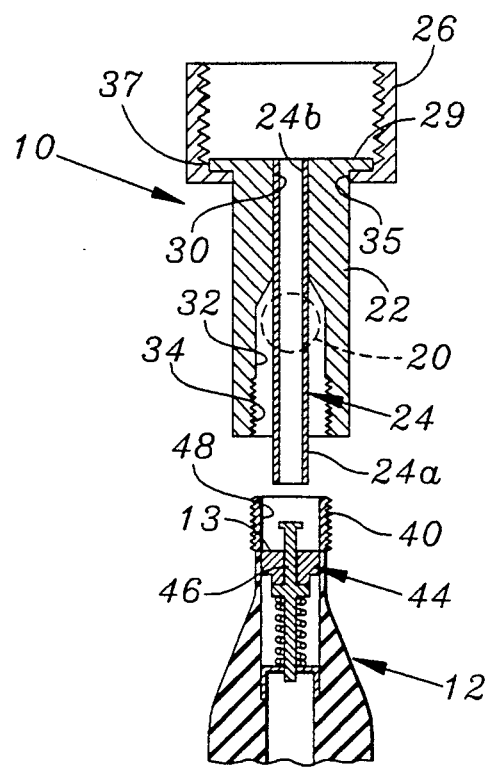
FIG. 2 is a cross-sectional view of the filling device of FIG. 1 in exploded relation to a tire valve stem, shown in cross-section.
Figure 3:
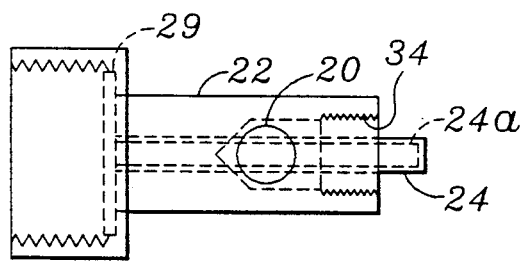
FIG. 3 is a side elevational view of the filling device of FIG. 1.
Figure 4:
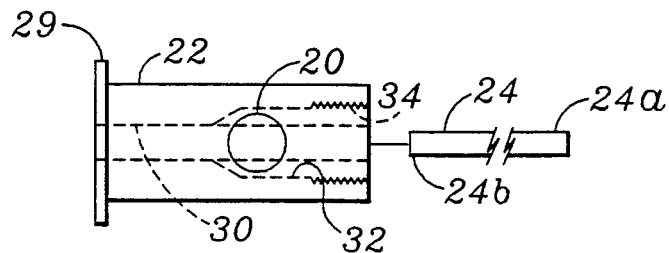
FIG. 4 is a side elevational view of the barrel member of the filling device of FIG. 1, shown in exploded relation to the valve engaging tube thereof.

As more particularly shown in FIG. 2, the device 10 includes three parts, these being a body or barrel 22, a valve tube 24 and a female hose fitting 26. By reference also to FIGS. 3 and 4, the body or barrel 22 is a cylindrically configured, preferably metallic, member with a flange portion 29 formed at one end thereof. The thickness of the flange portion 29 is small compared to the overall length of the barrel 22. The barrel 22 is formed, such as by machining on a metal lathe, with a first axially extending bore portion 30 extending therethrough. A second, larger diameter counterbore portion 32 is formed coaxially with the first bore portion 30. The vent aperture 20 is formed in fluid flow communication with the larger diameter bore portion 32. The inner wall of the counterbore portion 32 is threaded at 34, with the thread diameter and pitch being selected for threadable mating engagement with the threaded end 40 of the conventional tire valve member 12.

The tube 24 is inserted through, and secured within, the bore portion 30, the tube 24 being preferably formed of a metallic material with the end 24b thereof sweat soldered to the interior of the bore portion 30. The outer diameter of the tube 24 is slightly smaller than the inner diameter of the bore portion 30. The length of the tube 24 is preselected so that the end 24a thereof will extend beyond the terminal end of the barrel 22. As shown in FIG. 2, the inner diameter of the tube 24 is sufficient to pass over the needle member 46, while the length of tube 24 is equal to the axial length of barrel 22 plus a distance sufficient for the end 24a to terminate in sufficient proximity to the top end of the valve needle 46 with the device 10 attached to the valve 12 as shown in FIG. 1. For a larger volume and/or faster fills, the valve stem assembly 44, consisting of valve seat 13 and spring-loaded needle valve 46, is removed.

Alternatively, if such valve assembly is not removed, the pressure of liquid entering tire valve 12 will activate the needle member 46 to its open position. The tube 24 may be of a smaller length sufficient for attachment at one end within the bore portion 30, so long as the other end extends the required distance beyond the terminal end of bore portion 32.

The hereinabove referred to preselected length facilitates soldering of the tube 24 within the bore 30. For soldering purposes or brazing, it is preferable that the barrel 22 and tube 24 be compatible, that is of similar metal, such a copper or brass. The inner diameter of the counterbore portion thread 34 is generally equal to the outer threaded diameter of the threaded valve portion end 40 for mating attachment thereto.

After attachment of tube 24 within barrel 22, the female hose fitting 26 is attached. Hose fitting 26 has an enlarged aperture 35 generally equal in diameter to the outer diameter portion of the main body portion of the barrel 22, with the diameter of the flange portion 29 being slightly less than the inner diameter of the walls 37 of the female hose fitting 26.

For construction and assembly of the device 10, the barrel 22 is first machined or turned from suitable stock to the desired outer diameter of the main body portion and to the desired outer diameter and thickness of the flange portion 29. A first hole is drilled axially along the center of the barrel 22 to a predetermined depth to form the enlarged bore portion 32 of the proper diameter. A second smaller diameter drill is then used to continue the hole thus drilled through the entire body of the barrel 22 along the axial centerline thereof to form the other bore portion 30 of the proper diameter.

The air vent aperture 20 is then drilled through the wall of the enlarged bore portion 32 at a position inwardly from the open end thereof, which position is in a non-interfering location relative to the thread 34. In this manner, with the barrel 22 threaded onto the valve end 40, there is unobstructed clearance for the vent aperture 20. The tube 24, which is cut to the preselected length, is of a diameter sufficient for being snugly received within the bore portion 30 until one end thereof is in alignment with the plane of the flange portion 29.

Sweat soldering is then utilized to join the parts together, that is, heat is applied to the outer surface of the barrel 22 adjacent the flange portion 29, and solder is applied when the heat of the parts is sufficient to cause flow of the solder into the space between the outer diameter of tube 24 and the inner diameter of bore portion 30. As can be seen, there is an annular vent space between the outer periphery of the tube 24 and the inner wall of the enlarged bore portion 32.

After the thus joined parts are cooled, the main body portion of the barrel 22 is inserted through the aperture 35 of the hose fitting 26. For this attachment, in order to maintain the fitting 26 captive, the periphery of the flange portion 29 may be of such a diameter that it can be threaded into the recess of the hose fitting, with the bottom of the interior recess of the fitting being relieved to thereafter permit rotation of the fitting 26 relative to the flange portion 29. Alternatively, the metal about the barrel 22 in proximity to the outer lower edge of the fitting 29 may be suitably deformed to maintain the fitting captive. In either event, it is preferable that the fitting 29 be rotatable relative to the barrel 22.

With the filling device 10 thus constructed, it is ready for use. As shown in FIG. 2, the valve 12 includes a valve stem assembly, generally designated 44, which includes an axially extending centrally positioned, spring-loaded valve needle member 46 coaxially located relative to bore 48 and valve seat 13. Such valve stem assemblies 44 are threaded within the bore 48 of the valve 12, with the spring loading such to normally bias the valve needle member 46 upwardly as viewed in the drawing which is the closed position, that is, no fluid can enter or leave the tire or tube. Depression of the valve needle member 46 in the downward direction as indicted by the arrow thereabove "opens" the valve, thereby enabling entry of air or fluid or release of the contents of the tire.

For use of the filling device wherein a larger volume is required and/or a faster fill is desired, valve stem assembly 44 is first removed. A hose 14 is then attached to the fitting 26. The filling device 10 is then attached to the valve end 40 by threadably coupling via the threaded inner end 34 of the enlarged bore portion 32 to the threaded valve end 40. As the filling device 10 is attached, the terminal end 24a of the centrally located tube 24 is in proximity to the area from which the valve stem assembly 44 was removed.

As liquid enters, the air from within the tire is displaced outwardly in the opposite direction through the bore of the valve 12 into the annular space between tube 24 and enlarged bore portion 32 and then outwardly through vent 20 into the atmosphere. After filling, liquid pressure is then removed by discontinuing the supply of liquid, and the filling device 10 is removed from its coupling with the valve end 40.

Alternatively, if valve stem assembly 44 is not removed, the terminal end 24a of the centrally located tube 24 surrounds or passes over the valve needle member 46 into engagement or proximate relation to the valve seat 13, or it may end in proximity to the adjacent end of the valve needle member 46. In either event, the water or other liquid is then applied, under pressure, through the hose 14, through the inner opening of the tube 24, and this pressure operates against the end of the needle member 46 to urge it to its "open" position, that is, downwardly, thus providing access for fluid into the interior of the tire or tube to which the valve 12 is attached The liquid then passes through the valve opening about the needle member 46 into the interior of the tire. After filling, liquid pressure is then removed by discontinuing the supply of liquid and the valve needle 24 returns to its "closed" position after which the filling device 10 is removed from its coupling with the valve end 40.

As can be seen, the filling device 10 in accordance with the instant invention is uncomplicated and economical to fabricate, includes only three parts (and a hose washer or gasket, if desired), and can be fabricated from readily available tools of readily available materials. Its use is likewise simple, by merely attaching to the conventional valve member 12 of the conventional tire or tube.

While there has been shown and described a preferred embodiment, it is to be understood that various other adaptations and modifications may be made within the spirit and scope of the invention.

What is claimed is:

1. A filling device for filling tires or tubes having a conventional tire valve member, said device being adapted for filling said tires or tubes with liquid, after removal of the valve stem assembly of said valve member, said device comprising:
    a barrel means;
    bore means axially extending through said barrel means, said bore means including first and second aligned bore portions of different sizes;
    means on said first bore portion for attachment tot he end of said tire valve member;
    air vent means in fluid flow communication between the interior of said first bore portion and the outer atmosphere;
    tube means in fluid flow communication with said second bore portion and having an end extending beyond the terminal end of said first bore portion a distance sufficient for cooperative engagement with said tire valve member when said filling device is attached to said tire valve member;
    fitting means coupled to the other end of said barrel means for attachment to pressurized source of liquid, the parts of said filling device being configured, dimensioned and arranged that pressurized liquid flowing through said fitting means flows through said tube means into the tire, while air escaping from the tire enters into said first bore portion for discharge through said vent means.

2. The device according to claim 1 wherein said first and second bore portions are generally circular in cross-section with said first bore portion being of a larger diameter than said second bore portion, and said tube means is a tubular member axially positioned and secured within said second bore portion.

3. The device according to claim 2 wherein an annular vent space is formed between the inner wall of said first bore portion and the outer wall of said tubular member, and escaping air from within the tire enters through this annular vent space and is discharged through said vent means when liquid is entering the tire.

4. The device according to claim 3 wherein the extending end of said tubular member extends into close proximity with the prior location of said valve stem assembly of said tire valve member.

5. The device according to claim 3 wherein said tubular member external diameter is configured with respect to the the inside diameter of the tire valve member for enabling the end of said tubular member to be received within said tire valve member such that with application of pressurized liquid through said fitting means liquid flows into the tire to displace air in the tire through said vent means.

6. The device according to claim 5 wherein said air vent means is a vent aperture in the wall of said barrel means.

7. The device according to claim 5 wherein said barrel means is a generally cylindrically configured member with a flange portion, and said fitting means is a hose fitting rotatably coupled to said barrel means and is attached to said flange portion.

8. A device for use with tires or tubes having a tire valve member with a spring biased valve needle member therein passing through a valve seat, said device being adapted for filling a tire with liquid, said device comprising:
    a generally cylindrical barrel member having a flange portion at an end thereof;
    fitting means coupled to said flange portion of said barrel member for attachment to a pressurized source of liquid;
    bore means axially extending through said barrel member, said bore means having a first bore portion and a second larger diameter bore portion, said first bore portion terminating at said flange portion;
    vent means in fluid flow communication with said second bore portion and the outer atmosphere;
    tube means positioned within said bore means in flow communication with said first bore portion, said tube means having an end extending out from the terminal end of said second bore portion;
    means on said second bore portion at the terminal end thereof for attachment to the end of the tire valve member, the parts of said device being configured, dimensioned and arranged that, with said valve needle member and said valve seat removed and the device attached to the valve, the end of said tube means extends into sufficient proximity with the prior location of the valve needle member and valve seat, and pressurized liquid flowing through said fitting means flows through said tube means into said tire, while air thereby displaced from the tire enters into said second bore portion and is discharged through said vent means.

9. The device according to claim 8 wherein an annular space is formed between the outer surface of said tube means and the inner wall of said second bore portion and said vent means is an aperture formed in the wall of said second bore portion.

10. The device according to claim 9 wherein said tube means is a tube member coaxially secured within said first bore portion.

11. The device according to claim 10 wherein said means on the inner wall of said second bore portion includes a threaded portion for threadable coaction with an end of the valve member, and said fitting means coupled to said flange portion is a female hose fitting.

12. The device according to claim 10 wherein said means on the inner wall of said second bore portion includes a threaded portion for threadable coaction with an end of the valve member and said aperture is formed axially inwardly of said threaded portion.

13. A device for use with tires or tubes having a valve member with a valve core assembly including a spring biased valve needle member therein passing through a valve seat, said device being adapted for filling a tire with liquid, after removal of said valve core assembly, said device comprising:

a generally cylindrical barrel member having a flange portion at an end thereof;

a hose fitting coupled to said flange portion for attachment to a pressurized source of liquid;

bore means axially extending through said barrel member, said bore means having a first bore portion and a second larger diameter bore portion, said first bore portion terminating at said flange portion;

an air venting aperture formed in the wall of said second bore portion;

a tube member coaxially secured within said first bore portion, said tube member and said second bore portion configured such that an annular space is formed between the outer surface of said tube means and the inner wall of said second bore portion, said tube member having an end extending out from the terminal end of said second bore portion;

thread means on the inner wall of said second bore portion at the terminal end thereof configured for threadable attachment to the end of said valve member, the parts of said device being configured, dimensioned and arranged that, with the device attached to the valve, the end of said tube member extends into proximity with the previous location of said valve core assembly and pressurized liquid flowing through said fitting flows through said tube member to permit flow of liquid into the tire, while displaced air escaping from the tire enters into said second bore portion for discharge through said annular space and said vent aperture.

14. A device for use with tires or tubes having a valve assembly including a core member having a spring biased valve needle member therein passing through a valve seat, said device being adapted for filling a tire with liquid, after removal of said core member, said device comprising:

a housing member having a flange portion at an end thereof;

a hose fitting coupled to said flange portion for attachment to a pressurized source of liquid;

aperture means axially extending through said housing member, said aperture means having a first aperture portion and a second larger cross-sectional aperture portion, said first aperture portion terminating at said flange portion;

air venting means formed in the wall of said second aperture portion in communication with the atmosphere;

a tube member coaxially secured within said first aperture portion and having a cross-sectional area less than that of said second aperture portion, said tube member having an end extending out from the terminal end of said second aperture portion;

thread means on said second aperture portion at the terminal end thereof configured for threadable attachment to the end of the valve assembly, the parts of said device being configured, dimensioned and arranged that, with the device attached to the valve assembly, the end of said tube member extends into proximity with the previous location of said core assembly and pressurized liquid flowing through said hose fitting flows through said tube member and into the tire, while displaced air escaping from the tire enters into said second aperture portion between the outer surface of said tube means and the inner wall of said second bore portion, for discharge through said venting means.

* * * * *